United States Patent (10) Patent No.: US 9,276,265 B2
Leuthner et al. (45) Date of Patent: Mar. 1, 2016

(54) LITHIUM-ION CELL, LITHIUM-ION RECHARGEABLE BATTERY AND MOTOR VEHICLE WITH A LITHIUM-ION RECHARGEABLE BATTERY

(75) Inventors: Stephan Leuthner, Leonberg (DE); Thomas Woehrle, Stuttgart-Feuerbach (DE); Holger Fink, Stuttgart (DE); Joachim Fetzer, Bad-Ditzenbach (DE)

(73) Assignee: Robert Bosch GmbH, Stuttgart (DE)

( * ) Notice: Subject to any disclaimer, the term of this patent is extended or adjusted under 35 U.S.C. 154(b) by 265 days.

(21) Appl. No.: 13/993,524

(22) PCT Filed: Nov. 22, 2011

(86) PCT No.: PCT/EP2011/070639
§ 371 (c)(1),
(2), (4) Date: Sep. 16, 2013

(87) PCT Pub. No.: WO2012/079921
PCT Pub. Date: Jun. 21, 2012

(65) Prior Publication Data
US 2014/0011072 A1    Jan. 9, 2014

(30) Foreign Application Priority Data
Dec. 13, 2010 (DE) .......................... 10 2010 062 873

(51) Int. Cl.
*H01M 4/70* (2006.01)
*H01M 2/26* (2006.01)
*H01M 10/0525* (2010.01)
*H01M 4/66* (2006.01)
*B60L 11/18* (2006.01)

(52) U.S. Cl.
CPC *H01M 4/70* (2013.01); *H01M 2/26* (2013.01); *H01M 10/0525* (2013.01); *B60L 11/18* (2013.01); *H01M 4/667* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| 5,518,839 | A  * | 5/1996 | Olsen .......................... 429/304 |
| 2006/0269840 | A1 * | 11/2006 | Oogami et al. ............... 429/181 |
| 2008/0107961 | A1 | 5/2008 | Jeong et al. |
| 2009/0233129 | A1 * | 9/2009 | Ojima et al. ................... 429/13 |

FOREIGN PATENT DOCUMENTS

| CN | 101383407 A | 3/2009 |
| EP | 0 690 517 A1 | 1/1996 |
| KR | 2010-0127983 | 12/2010 |

OTHER PUBLICATIONS

International Search Report corresponding to PCT Application No. PCT/EP2011/070639, mailed Mar. 12, 2012 (German and English language document) (5 pages).
Thomas Scientific, Database WPI Week 201107, London, GB, AN 2010-Q51162 XP002669650.

\* cited by examiner

*Primary Examiner* — Patrick Ryan
*Assistant Examiner* — Carmen Lyles-Irving
(74) *Attorney, Agent, or Firm* — Maginot, Moore & Beck LLP

(57) ABSTRACT

A lithium-ion cell includes outgoing conductor foils and collectors. The outgoing conductor foil of a negative electrode of the lithium-ion cell consists of an aluminum foil which is covered on both sides with a metal layer. The collector for the negative electrode has an aluminum workpiece, which is at least partially covered with a metal layer. The metal layers of the outgoing conductor foil and of the collector consist of copper or nickel.

7 Claims, 1 Drawing Sheet

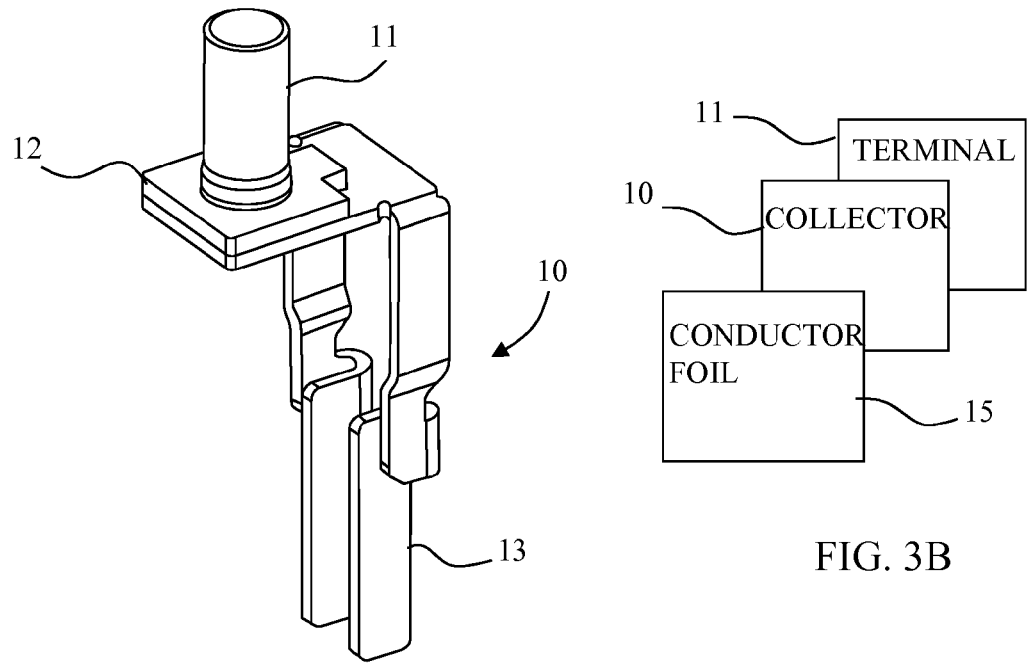
FIG. 1
FIG. 2
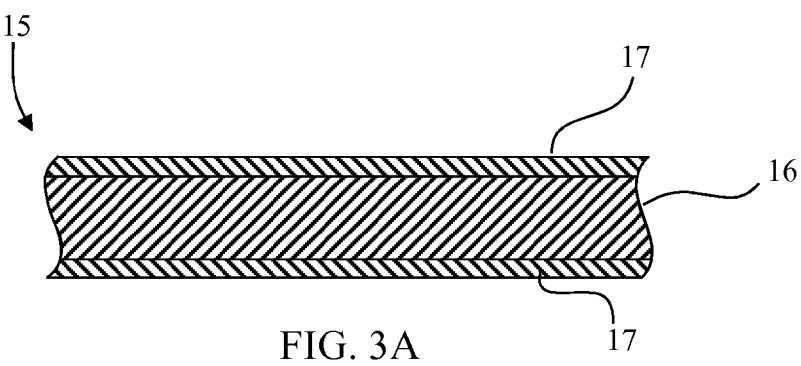
FIG. 3A
FIG. 3B

LITHIUM-ION CELL, LITHIUM-ION RECHARGEABLE BATTERY AND MOTOR VEHICLE WITH A LITHIUM-ION RECHARGEABLE BATTERY

This application is a 35 U.S.C. §371 National Stage Application of PCT/EP2011/070639, filed on Nov. 22, 2011, which claims the benefit of priority to Serial No. DE 10 2010 062 873.5, filed on Dec. 13, 2010 in Germany, the disclosures of which are incorporated herein by reference in their entirety.

The present disclosure relates to a lithium-ion cell, to a lithium-ion rechargeable battery with at least two lithium-ion cells and also to a motor vehicle with an electrical drive motor for driving the motor vehicle and to a lithium-ion rechargeable battery that is connected or can be connected to the electrical drive motor.

BACKGROUND

Lithium-ion cells have at least one positive electrode and one negative electrode (cathode and anode, respectively), which can reversibly intercalate or deintercalate lithium ions (Li+). The terms lithium-ion cell, lithium-ion polymer cell, lithium-ion cell, battery, rechargeable battery and system are used largely synonymously.

Lithium-ion rechargeable batteries have to meet demanding requirements, in particular in the automotive sector, with respect to the gravimetric energy density (given in Wh/kg), in order for example to achieve the greatest possible ranges for vehicles driven by electric motors. The nominal capacity of a lithium-ion cell is determined by what are known as the active materials, for example lithiated transition metal oxides such as lithium-nickel oxide ($LiNiO_2$) in the positive electrode and graphites or carbons in the negative electrode. However, in every lithium-ion cell there are also what are known as passive materials or "dead materials", which consequently have an influence on the energy density of the lithium-ion cell. These include, for example, electrically conductive material, electrode binders, separators, outgoing conductor foils, collectors, terminals and the housing of the cell or of the rechargeable battery itself.

Outgoing conductor foils serve the purpose of electrically contacting and bonding the positive electrode and the negative electrode, the contact with the terminals being made by means of the collectors.

The construction of a lithium-ion cell with outgoing conductors, collectors and the external terminals is known.

In lithium-ion cells, aluminum-based outgoing conductor foils, collectors and terminals are usually used for the positive electrode side. On the negative electrode side, copper, nickel or nickel-plated copper is used, since otherwise, if aluminum were used on the negative side, there would be an alloying of lithium and aluminum on account of the potential that is present.

The use of copper or nickel as a passive material in a lithium-ion cell results in higher production costs. Moreover, this constitutes the use of passive materials, which have a higher crystallographic density in comparison with aluminum. Thus, aluminum has a density of 2.7 $g/cm^3$ and copper and nickel have a density of 8.9 $g/cm^3$. Accordingly, the use of copper or nickel as materials in lithium-ion rechargeable batteries has an adverse effect on the gravimetric energy density.

SUMMARY

According to the disclosure, a weight-reduced lithium-ion cell that has an aluminum-based outgoing conductor foil and an aluminum-based collector for the negative electrode side is provided, the outgoing conductor foil and the collector being provided on both sides, or at least partially, with a metallic layer that prevents alloying of the outgoing conductor foil and the collector with lithium ions during the operation of the lithium-ion cell. The metallic layer consists of copper or of nickel.

Preferably, the production of the outgoing conductor foil according to the disclosure is not based on a customary outgoing conductor foil of aluminum for the positive side, but instead thinner aluminum foils are used, with the result that a customary thickness of about 12 μm is obtained after the coating with copper or nickel on both sides, the edges of the outgoing conductor foil preferably also being coated. For example, the copper layers may be respectively 1 μm thick, with the result that the thickness of the aluminum core is 10 μm. Other dimensionings of the layers or the total thickness of the outgoing conductor foil are possible of course, while the outer layers should be as thin as possible. Thus, a lower weight is achieved with the same foil thickness than in the case of a customarily used copper foil.

The metallic layer of copper or nickel may also be provided only in the region that is contacted by the electrode. A coating of the collector that goes beyond this or a complete coating of the collector is preferred.

To simplify production processes, the collector should be completely surrounded by the metallic layer.

Preferably, the production of the collector according to the disclosure is not based on a customary collector for the positive electrode side of aluminum, but instead workpieces with a lower material thickness are used, with the result that a customary thickness of about 1-5 mm is only obtained after the coating with copper or nickel.

For example, the copper or nickel layer may be 5 μm thick and the thickness of the aluminum core 1000 μm.

Other dimensionings of the layers or the total thickness of the collector are possible of course, while the metallic layer should be as thin as possible. Thus, a lower weight is achieved with the same dimensioning of the collector than according to the prior art.

In this way, a collector and an outgoing conductor foil that advantageously have a lower weight with the same volume than conventional copper- or nickel-based components are obtained, with the result that a significantly weight-optimized lithium-ion cell with an increased energy density is obtained.

The weight advantages of the aluminum can consequently be made usable in a lithium-ion cell not only for the positive electrode but also for the negative electrode side, and at the same time the disadvantage of the alloying due to lithium can be avoided.

The outgoing conductor foil and the collector for the lithium-ion cell according to the disclosure are made up by applying a thin copper foil or layer to the aluminum foil or the aluminum workpiece. Alternatively, nickel may also be used for the surface coating.

The application of the thin layers of copper or nickel to the aluminum foil is preferably performed either a) galvanically
b) by roll-bonded cladding or
c) by means of ion beam deposition.

In the case of all the methods, it must be ensured that the layer applied does not have any defects, since the intercalation of lithium in the aluminum core of the collector otherwise occurs.

The weight-reduced components for the negative electrode side, and consequently the lithium-ion cell according to the disclosure, are surprisingly stable over a long time. Moreover, the lithium-ion cell displays an identical electrical performance and identical behavior under long-term cycling and storage at up to 60° C., even in the fully charged state, to that of a reference cell with a conventional component of copper or nickel.

One of the reasons why the properties of the collector according to the disclosure were surprising was that detachment of the copper or nickel layer from the aluminum workpiece could not be ruled out a priori during the storage or operation on account of electrolyte instability or due to traces of hydrogen fluoride (HF) in the cells. This would have been very disadvantageous for the electrochemical performance of the lithium-ion cell.

Particularly preferred are lithium-ion cells with the collector according to the disclosure that has been surface-coated by means of ion beam deposition, and with outgoing conductor foils that have been produced by means of roll-bonded cladding or ion beam deposition, since they have achieved the best results in aforementioned comparative tests.

The subject matter of the present disclosure is also a lithium-ion rechargeable battery with at least two previously described lithium-ion cells and also a motor vehicle with an electrical drive motor for driving the motor vehicle and a lithium-ion rechargeable battery that is connected or can be connected to the electrical drive motor.

Advantageous developments of the disclosure are specified in the embodiments below and described in the description.

BRIEF DESCRIPTION OF THE DRAWINGS

Exemplary embodiments of the disclosure are explained in more detail in the description which follows and on the basis of drawings, in which:

FIG. 1 shows in a perspective view a collector for the negative electrode of a lithium-ion cell according to the disclosure with a customary spatial configuration, FIG. 2 shows a sectional side view of the collector according to FIG. 1, FIG. 3A shows in a sectional side view an outgoing conductor foil for the negative electrode of a lithium-ion cell according to the disclosure, and FIG. 3B shows in a schematic view the conductor foil of FIG. 3A and the collector and terminal of FIG. 1.

DETAILED DESCRIPTION

Represented in FIG. 1 is a collector 10 for a lithium-ion cell according to the disclosure (not represented) that is connected to a terminal 11, which has a base 12. The collector 10 is surrounded by a metallic layer 13 of copper or nickel and has a core comprising an aluminum workpiece 14. To illustrate the construction, a section through the collector 10 is shown in FIG. 2, the aluminum workpiece 14 being covered by the metallic layer 13, which is very thin in relation to the aluminum workpiece 14 to optimize weight. In FIG. 3A, the construction of an outgoing conductor foil 15 is shown. The outgoing conductor foil 15 has a core of an aluminum foil 16, which is covered on both sides by a metallic layer 17. Like the metallic layer 13 in the case of the collector according to FIGS. 1 and 2, the metallic layer 17 prevents lithium from alloying the aluminum foil 16 during the operation of the lithium-ion cell. The layer 17 consists of copper or nickel. Since it is intended with the outgoing conductor foil 15 according to the disclosure to obtain a weight-optimized outgoing conductor foil 15, the dimensioning of the aluminum foil 16 and of the two layers 17 should be set correspondingly, that is to say the layers 17 should be made as thin as possible. FIG. 3B depicts, in schematic form, the conductor foil 15 along with the associated collector 10 and terminal 11.

The invention claimed is:

1. A lithium-ion cell, comprising:
a negative terminal;
a negative electrode of the lithium-ion cell, the negative electrode including an aluminum foil covered on both sides or completely with a first metallic layer of copper or nickel; and
a collector extending between the negative terminal and the negative electrode and in electrical communication with the negative terminal and the negative electrode, the collector including an aluminum workpiece covered, at least in a contact region configured to be in contact with the negative electrode of the lithium-ion cell, with a second metallic layer of copper or nickel.

2. The lithium-ion cell as claimed in claim 1, wherein the collector is completely surrounded by the second metallic layer.

3. The lithium-ion cell as claimed in claim 1, wherein at least one of the first metallic layer and the second metallic layer is applied galvanically.

4. The lithium-ion cell as claimed in claim 1, wherein at least one of the first metallic layer and the second metallic layer is applied by roll-bonded cladding.

5. The lithium-ion cell as claimed in claim 1, wherein at least one of the first metallic layer and the second metallic layer is applied by ion beam deposition.

6. A lithium-ion rechargeable battery comprising:
at least two lithium-ion cells, each lithium-ion cell including:
a negative electrode of the lithium-ion cell, the negative electrode including an aluminum foil covered on both sides or completely with a first metallic layer of copper or nickel; and
a collector extending between a negative terminal and the negative electrode and in electrical communication with the negative terminal and the negative electrode, the collector including an aluminum workpiece covered, at least in a contact region configured to be in contact with the negative electrode of the lithium-ion cell, with a second metallic layer of copper or nickel.

7. A motor vehicle, comprising:
an electrical drive motor configured to drive the motor vehicle; and
a lithium-ion rechargeable battery configured to be connected to the electrical drive motor, the lithium-ion rechargeable battery including:
at least two lithium-ion cells, each lithium-ion cell including:
a negative electrode of the lithium-ion cell, the negative electrode including an aluminum foil covered on both sides or completely with a first metallic layer of copper or nickel; and
a collector extending between a negative terminal and the negative electrode and in electrical communication with the negative terminal and the negative electrode, the collector including an aluminum workpiece covered, at least in a contact region configured to be in contact with the negative electrode of the lithium-ion cell, with a second metallic layer of copper or nickel.

* * * * *